United States Patent [19]
Kobayashi

[11] Patent Number: 5,805,566
[45] Date of Patent: Sep. 8, 1998

[54] DISC CARTRIDGE

[75] Inventor: Daiki Kobayashi, Miyagi, Japan

[73] Assignee: Sony Corporation, Tokyo, Japan

[21] Appl. No.: 531,079

[22] Filed: Sep. 20, 1995

[30] Foreign Application Priority Data

Sep. 27, 1994 [JP] Japan .................................. 6-231933

[51] Int. Cl.$^6$ ............................. G11B 23/03; G11B 19/04
[52] U.S. Cl. ............................. 369/291; 360/133; 360/60
[58] Field of Search ............................. 369/291; 360/132, 360/133, 134, 60

[56] References Cited

U.S. PATENT DOCUMENTS

| | | | |
|---|---|---|---|
| 4,507,692 | 3/1985 | Sasaki | 360/60 |
| 4,660,105 | 4/1987 | Harris et al. | 360/60 |
| 4,685,017 | 8/1987 | Swinburne et al. | 360/133 |
| 4,796,138 | 1/1989 | Ono | 360/133 |
| 4,844,378 | 7/1989 | Oishi | 360/132 X |
| 4,860,127 | 8/1989 | Takahashi et al. | 360/60 |
| 4,908,725 | 3/1990 | Iwahashi | 360/132 |
| 4,918,559 | 4/1990 | Maruyama et al. | 360/133 |
| 4,995,029 | 2/1991 | Kobayashi et al. | 369/291 |
| 5,040,167 | 8/1991 | Tanaka et al. | 369/291 |
| 5,041,923 | 8/1991 | Iwata et al. | 360/60 |
| 5,087,998 | 2/1992 | Oishi | 360/132 |
| 5,091,815 | 2/1992 | Suzuki | 360/133 |
| 5,091,901 | 2/1992 | Yamamoto et al. | 369/291 |
| 5,121,279 | 6/1992 | Saeki et al. | 360/133 |
| 5,150,269 | 9/1992 | Iwaki et al. | 360/133 |
| 5,173,816 | 12/1992 | Ogihara | 360/69 |
| 5,218,502 | 6/1993 | Tanaka et al. | 360/132 |
| 5,239,437 | 8/1993 | Hoge et al. | 360/132 |
| 5,243,580 | 9/1993 | Maeda | 369/13 |
| 5,272,693 | 12/1993 | Fujisawa | 369/291 |
| 5,367,422 | 11/1994 | Fujisawa et al. | 360/133 |

FOREIGN PATENT DOCUMENTS

| | | |
|---|---|---|
| 0 206 897 A3 | 12/1986 | European Pat. Off. . |
| 0 472 443 A1 | 2/1992 | European Pat. Off. . |
| 0 500 271 A2 | 8/1992 | European Pat. Off. . |

*Primary Examiner*—Stuart S. Levy
*Assistant Examiner*—William J. Klimowicz
*Attorney, Agent, or Firm*—Limbach & Limbach L.L.P.

[57] ABSTRACT

A disc cartridge which includes a mistaken recording inhibiting member, the mistaken recording inhibiting member having a mistaken recording inhibiting portion for closing a mistaken recording detection hole formed in the cartridge main body, an actuating portion for movement between a first position of closing the mistaken recording detection hole and a second position of opening the mistaken recording detection hole, and an indicating portion positioned facing an indicating hole formed in the cartridge main body for visually indicating, by means of a mark or color, through the indicating hole the sort of the disc housed within the cartridge main body when the mistaken recording inhibiting member is at a predetermined one of the first position or the second position.

11 Claims, 5 Drawing Sheets

DISC CARTRIDGE

BACKGROUND

1. Field of the Invention

This invention relates to a disc cartridge and, more particularly, to a disc cartridge capable of discriminating the types of recording media housed therein.

2. Background of the Invention

There have hitherto been extensively employed disc cartridges housing discs, such as an optical disc or a magneto-optical disc, as disc-shaped recording media, capable of recording audio signals, such as music information, or data signals, such as letter data. These disc cartridges may be classified into those housing an optical disc or a magneto-optical disc, exclusively aimed at recording and/or reproducing audio signals and used as recording media for a disc recording and/or reproducing apparatus aimed at recording/reproduction of audio signals, and those housing an optical disc or a magneto-optical disc, exclusively aimed at recording and/or reproducing the data information, such as letter or moving-picture information, and used as recording media for computer data terminal equipments.

A disc cartridge housing a magneto-optical disc 64 mm in diameter has been proposed as a recording medium capable of re-recording audio signals, such as music signals, and an optical disc player employing a magneto-optical disc housed within this disc cartridge has been commercialized. A disc cartridge housing a magneto-optical disc having the same size as the magneto-optical disc capable of re-recording audio signals and yet capable of exclusively recording and/or reproducing data signals, such as letter data or moving-picture data, has also been proposed.

The disc cartridge housing a magneto-optical disc exclusively used for recording and/or reproducing audio signals and the disc cartridge housing a magneto-optical disc exclusively used for recording and/or reproducing data signals have the size of the disc housed therein in common, so that these disc cartridges are of substantially the same outer shape. That is, these two disc cartridges have the location and the size of the aperture for recording/reproduction and the size and shape of a shutter member opening or closing a recording/reproducing aperture formed in a main cartridge body, substantially in common.

For this reason, the disc cartridge housing a magneto-optical disc exclusively used for recording and/or reproducing audio signals and the disc cartridge housing a magneto-optical disc exclusively used for recording and/or reproducing data signals are substantially of the same size and shape, since these disc cartridges have the disc size in common. Thus it is extremely difficult to discriminate the magneto-optical disc exclusively used for recording and/or reproducing audio signals from that exclusively used for recording and/or reproducing data signals.

The disc cartridge housing a magneto-optical disc used exclusively for recording/reproducing audio signals and the disc cartridge housing a magneto-optical disc used exclusively for recording/reproducing data signals differ in recording capacity or recording format, although the disc size is common, so that these discs cannot be interchangeably used in the recording and/or reproducing apparatus employing the respective discs as the recording media. Therefore, if the disc cartridges housing the respective magneto-optical discs are incorrectly used in the recording and/or reproducing apparatus for audio signals or in the recording and/or reproducing apparatus for data signals, the desired signals cannot be recorded or reproduced.

In order that the disc cartridges housing different sorts of discs while having a substantially common appearance may be easily discriminated on visual observation of the appearance thereof, it has been proposed to vary the color of the cartridge main body depending upon the sort of the disc housed therein. That is, by unifying the colors of the main cartridge body of the disc cartridge housing a magneto-optical disc used exclusively for recording/reproducing audio signals and main cartridge body of the disc cartridge housing a magneto-optical disc used exclusively for recording/reproducing data signals, the sorts of the discs of the disc cartridges are indicated by the color tint pertaining to the appearance of the disc cartridges.

There is also proposed a disc cartridge in which the sort or the contents of the disc housed therein is printed on the surface of the cartridge main body or a label having the sort or the content printed thereon is applied on such surface for indicating the sorts of the disc cartridges.

There is also proposed a disc cartridge in which the cartridge main body is molded by two-color molding of plural sorts of synthetic resin materials of different colors so that a colored portion different in color from the remaining portions is formed in the cartridge main body and such colored portion performs the role of discriminating the sort of the disc housed within the main cartridge body.

In a disc cartridge colored to a pre-set color tint in its entirety depending on the disc sort, the colors used for the disc cartridges housing different sorts of the discs become fixed depending on the disc types. Since the color tints of the disc cartridges are specified depending on the disc sorts, it becomes impossible to constitute the disc cartridges by freely selecting the color tints.

If the disc cartridges are of fixed color tints depending upon the disc sorts, limitations are imposed on the synthetic resin materials constituting the disc cartridges. The result is that disc cartridges of sufficient strength to assure protection of the discs housed therein cannot be produced.

With the disc cartridge in which indication of the sort of the disc housed therein is made by printing, a printing process for making such indication is required, so that the disc cartridge production process becomes complicated, while a printer needs to be employed for printing the indication. The result is that the disc cartridge production system becomes complex while the cost of the disc cartridge is also raised. With the disc cartridge having an indicating label indicating the sort of the disc housed in the main cartridge body, a step of bonding the label on the cartridge main body and a device for application of the label are required thus complicating the disc cartridge production process. The result is that the disc cartridge production system is complicated as in the case of that for the disc cartridge having the printed indication, while cost of the disc cartridge is also raised.

In addition, with the disc cartridge in which a discriminating portion for discriminating the disc sort is provided in a portion of the cartridge main body 4 by molding the cartridge main body by two-color molding consisting in two-stage molding of plural sorts of the synthetic resin materials, the metal mold for molding the main cartridge body and the molding process become complex while the molding efficiency is lowered and productivity cannot be improved. Since the cartridge main body is molded of at least two synthetic resin materials, sufficient durability of the disc cartridge cannot be maintained.

SUMMARY OF THE INVENTION

It is therefore an object of the present invention to provide a disc cartridge which resolves the above-mentioned problems.

According to the present invention, there is provided a disc cartridge including a main cartridge body, a shutter member and a mistaken recording inhibiting member. The cartridge main body rotatably houses a disc on which information signals are pre-recorded or are to be recorded and a recording-reproducing aperture via which the disc housed therein is exposed to the outside along the radius of the disc. The shutter member is movably mounted on the cartridge main body and opens/closes the recording/reproducing aperture. A mistaken recording inhibiting member has a mistaken recording inhibiting portion of a size sufficient to close a mistaken recording detection hole formed in the cartridge main body, an actuating portion for movement between a first position of closing the mistaken recording detection hole by the mistaken recording inhibiting portion and a second position of opening the mistaken recording detection hole, and an indicating portion positioned facing an indicating hole formed in the cartridge main body for indicating the sort of the disc housed within the cartridge main body.

According to the present invention, there is also provided a disc cartridge including a main cartridge body, a shutter member and, an actuating member and an indicating portion. The cartridge main body rotatably houses a disc-shaped recording medium and a recording-reproducing aperture via which the disc housed therein is exposed to the outside along the radius of the disc. A detection hole for detecting whether or not information signals can be recorded on the disc-shaped recording medium is formed in one major surface of the cartridge main body. The shutter member is movably mounted on the cartridge main body and opens/closes the recording/reproducing aperture. The actuating member has an opening/closing portion of a size sufficient to close the detection hole of the cartridge main body and an actuating portion movable between a first position of closing the detection hole by the opening/closing portion and a second position of opening the detection hole by the opening/closing portion. The actuating member is arranged in the cartridge main body for movement between the first position and the second position. The indicating means is provided on the other surface of the cartridge main body for indicating the sort of the disc-shaped recording medium housed within the cartridge main body.

DESCRIPTION OF THE PREFERRED EMBODIMENT

Figure 1:
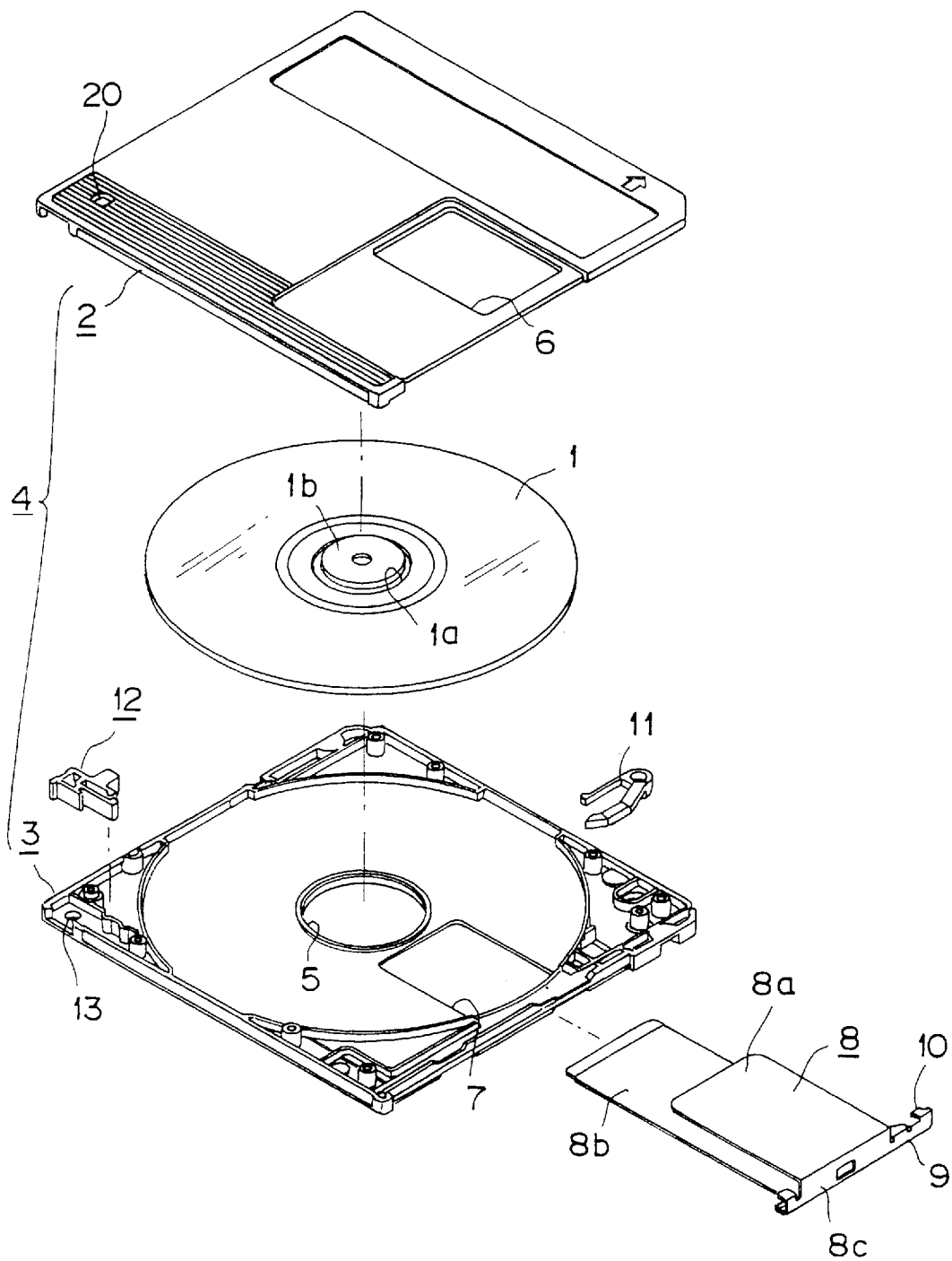
FIG. 1 is an exploded perspective view of a disc cartridge according to the present invention.

Referring to the drawings, a disc cartridge according to the present invention will be explained in detail.

The disc cartridge according to the present invention houses a magneto-optical disc 1, which is a disc capable of erasing previously recorded information signals and re-recording new information signals, as a disc-shaped recording medium. The magneto-optical disc housed in the disc cartridge is exclusively used for recording the data information.

The disc cartridge housing the magneto-optical disc 1 includes a main cartridge body 4 formed by abutting and bonding a pair of cartridge halves, that is an upper cartridge half 2 and a lower cartridge half 3. The magneto-optical disc 1 is rotatably housed within the cartridge main body 4.

With the cartridge main body 4, an aperture 5 for a disc table, into which is intruded the disc table of a disc rotating driving device for rotationally driving a magneto-optical disc on loading a disc cartridge comprised of the cartridge main body 4 into a recording and/or reproducing apparatus, is formed at a mid portion of the lower major surface of the disc cartridge constituted by the lower cartridge half 3. Specifically, the aperture 5 for the disc table is formed as a circular opening at a mid portion of the lower cartridge half 3 for enabling an inner peripheral portion inclusive of a center opening 1a of the magneto-optical disc 1 in the cartridge main body 4 set on the disc table to be exposed to outside, as shown in FIG. 1. The magneto-optical disc 1 is fitted with a disc hub 1b of metal or the like magnetic material configured for clamping the magneto-optical disc 1 to the disc table.

Figure 2:
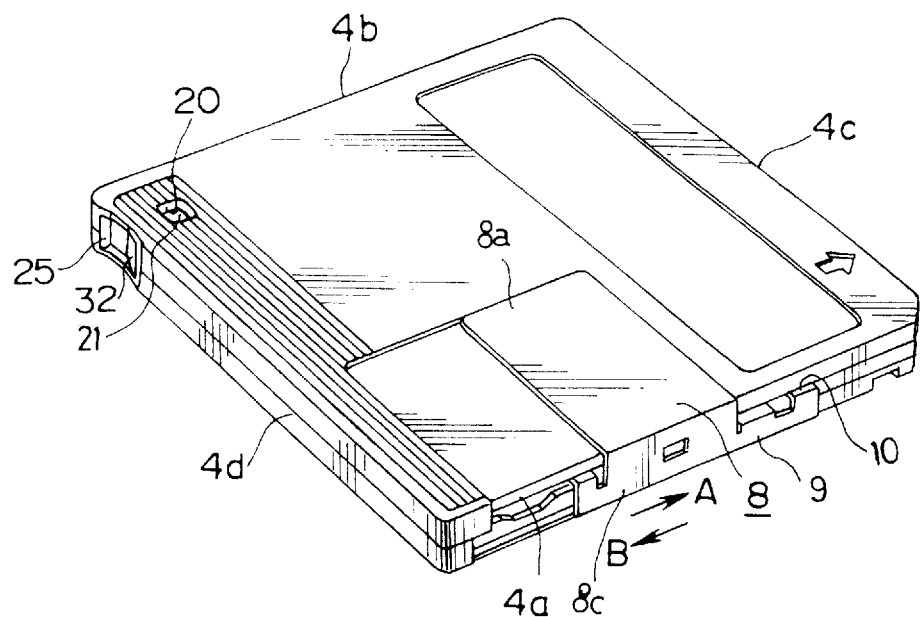
FIG. 2 is a perspective view of a disc cartridge according to the present invention, as seen from an upper side.

The upper and lower surfaces of the cartridge main body 4, that is the upper and lower cartridge halves 2, 3, are formed with recording/reproducing apertures 6, 7 for exposing at least a portion of the signal recording area of the magneto-optical disc 1 housed in the cartridge main body 4 across the inner and outer rims of the disc. These recording/reproducing apertures 6, 7 are rectangular in shape and disposed at a mid portion along the transverse direction of the disc for extending from a position proximate to the aperture 5 for the disc table to a front side 4a of the main cartridge body 4, as shown in FIGS. 1 and 2.

On the main cartridge body 4 is movably mounted a shutter member 8 configured for closing the recording/reproducing apertures 6, 7 for prohibiting the magneto-optical disc 1 introduced therein from being inadvertently contacted by the user's hand or finger via the recording/reproducing apertures 6, 7 and for prohibiting dust and dirt from being intruded to the disc. The shutter member 8 is fabricated by punching a thin sheet of metal, such as stainless steel, and bending the punched sheet to a U-shaped cross-section. The shutter member 8 is made up of a first shutter portion 8a closing the recording/reproducing aperture 6 formed in the upper major surface of the cartridge main body 4, a second shutter portion 8b for simultaneously closing the recording/reproducing aperture 7 formed in the lower major surface of the cartridge main body 4 and a connecting web 8c interconnecting proximal end portions of the first and second shutter portions 8a, 8b. On one side of the connecting web 8c is formed a movement guide portion 9 for guiding the translatory movement of the shutter member 8 mounted on the cartridge main body 4 along the front side 4a of the cartridge main body 4.

The shutter member 8 is engaged from the front side 4a of the cartridge main body 4 by extending the first shutter portion 8a over the recording/reproducing apertures 6 in the upper surface of the cartridge main body 4 and by extending the second shutter portion 8b over the recording/reproducing apertures 7 in the lower surface of the cartridge main body 4 and over the aperture 5 for the disc table. The shutter member 8 is mounted for movement along the direction indicated by arrows A and B in FIG. 2 between the position of closing the recording/reproducing apertures 6, 7 and the aperture 5 for the disc table and the position of opening the recording/reproducing apertures 6, 7 and the aperture 5 for the disc table, as shown by solid lines in FIGS. 2 and 3.

Figure 3:
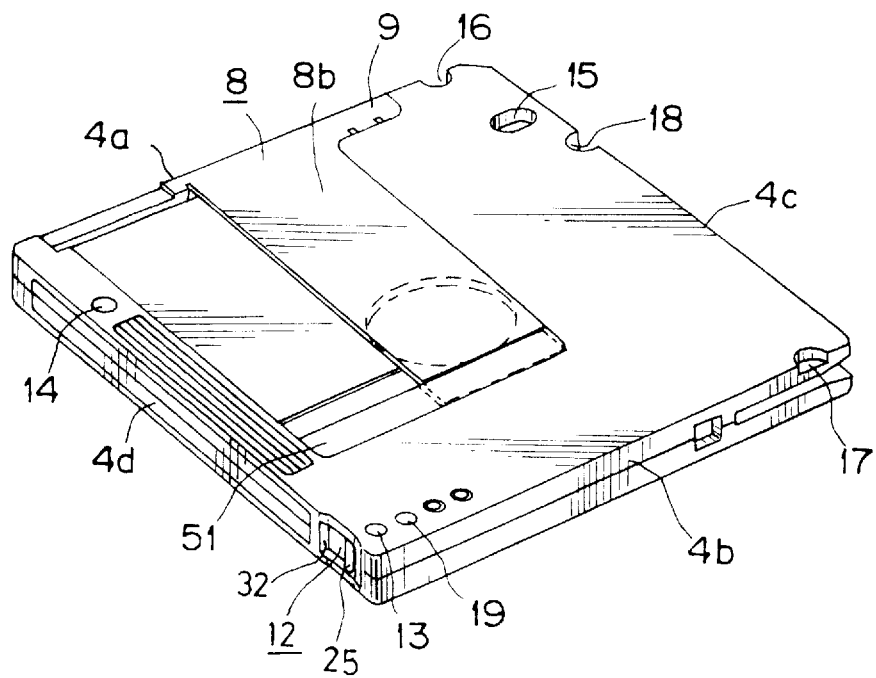
FIG. 3 is a perspective view of a disc cartridge according to the present invention, as seen from an upper side.

The free end of the second shutter portion longer in length than the first shutter portion 8a of the shutter member 8 movably mounted on the cartridge main body 4 is supported by a shutter retention plate 51 mounted on the lower surface of the cartridge main body 4 for being prevented from being floated from the cartridge main body 4, as shown in FIG. 3. The shutter retention plate 51 is of a length sufficient to support the free end of the second shutter portion 8b along the range of movement of the shutter member 8.

At a corner on the front surface of the lower half 3 constituting the main cartridge body 4, there is mounted a shutter lock member 11, as shown in FIG. 1. The shutter lock member 11 is configured for being engaged with a mating lock member 10, formed by bending a portion of the movement guide portion 9 for holding the shutter member 8 in the closing position for preventing inadvertent movement of the shutter member 8 from the position closing the recording/reproducing apertures 6, 7 shown in FIGS. 2 and 3 to the position of opening the recording/reproducing apertures 6.

At a corner of the rear surface 4b of the cartridge main body 4 diametrically opposite to a corner of the front surface 4a provided with the shutter lock member 11, with the aperture 5 for the disc table in-between, there is mounted a mistaken recording inhibiting member 12, as shown in FIG. 1. The mistaken recording inhibiting member 12 is arranged within the cartridge main body 4 by being held for movement within the lower cartridge half 3. At the corner on the rear surface 4b provided with the mistaken recording inhibiting member 12 of the lower half 3, there is formed a detection hole 13 opened and closed by movement of the mistaken recording inhibiting member 12. That is, the detection hole 13 is formed in the lower major surface of the cartridge main body 4 at a corner of the rear surface 4b of the cartridge main body 4, as shown in FIG. 3.

The lower major surface of the cartridge main body 4 formed with the detection hole 13 is formed with pin engagement holes 14, 15 engaged by positioning pins configured for setting the loading position of the disc cartridge when the disc cartridge is loaded on the cartridge loading portion within the recording and/or reproducing apparatus, as shown in FIG. 3. These pin engagement holes 14, 15 are formed at the corners of the shutter member carrying front surface 4a opposite to the rear surface 4b formed with the detection hole 13. The lower major surface of the cartridge main body 4 is formed with engagement recesses 16, 17 engaged by the cartridge holding portions of an automatic loading system employed for automatic loading of the disc cartridge on a cartridge loading portion within the recording and/or reproducing apparatus. These engagement recesses 16, 17 are formed in the front side 4a and the rear side 4b near the lateral side 4c running at right angles to the shutter member carrying front side 4a and operating as an end via which the disc cartridge is to be inserted into the cartridge loading portion, as shown in FIG. 3.

The lower major surface of the cartridge main body 4 is formed with a recess 18 indicating that the disc housed within the present main cartridge body 4 is a magneto-optical disc 1, as shown in FIG. 3. The recess 18 is used for controlling the lifting of an external magnetic field generating device for the recording and/or reproducing apparatus. This indicating recess 18 is formed towards the front side 4a in the lateral side 4c operating as an inserting end into the cartridge loading portion.

The lower major surface of the cartridge main body 4 is formed with plural disc discriminating holes 19 which are located in a side-by-side relation with respect to the detection hole 13 towards a lateral side 4d opposite to the lateral side 4c via which the cartridge main body 4 is introduced into the cartridge loading portion, as shown in FIG. 3. The disc discriminating holes 19 are used for discriminating the types of the discs housed within the cartridge main body 4.

With the disc cartridge according to the present invention, the upper major surface of the cartridge main body 4 is formed with a display hole 20 for exposing to the outside an indicating piece 21 provided in the mistaken recording inhibiting member 12 for indicating the type of the disc housed within the cartridge main body 4. The display hole 20 is formed in an area within the range of movement of the mistaken recording inhibiting member 12 provided in the main cartridge body 4. The indicating hole 20 is formed at a corner of the rear surface 4b of the cartridge main body 4, as shown in FIG. 2. The indicating hole 20 is formed at a position offset in the planar direction of the cartridge main body 4 with respect to the detection hole 13 formed in the opposite surface of the cartridge main body 4, as shown in FIG. 4.

The mistaken recording inhibiting member 12, having the indicating piece 21 exposed to the indicating hole 20 formed in the cartridge main body 4, is molded from a synthetic resin material having a color different from that of the cartridge main body 4. That is, the mistaken recording inhibiting member 12 inclusive of the indicating piece 21 is colored in a pre-set different manner from the color of the cartridge main body 4.

When the mistaken recording inhibiting member 12 has been moved to a position of registering the indicating piece 21 with the indicating hole 20, the indicating piece 21 different in color from the cartridge main body 4 is exposed to the outside of the cartridge main body 4 via the indicating hole 20. The color tint of the indicating piece 21 exposed in the indicating hole 20 indicates whether the disc housed within the cartridge main body 4 is designed for exclusively recording music signals or designed for exclusively recording the data information. That is, the indicating piece 21 exposed in the indicating hole 20 formed in the upper major surface of the cartridge main body 4 performs the role of indicating the type of the disc housed within the cartridge main body 4.

Figure 4:
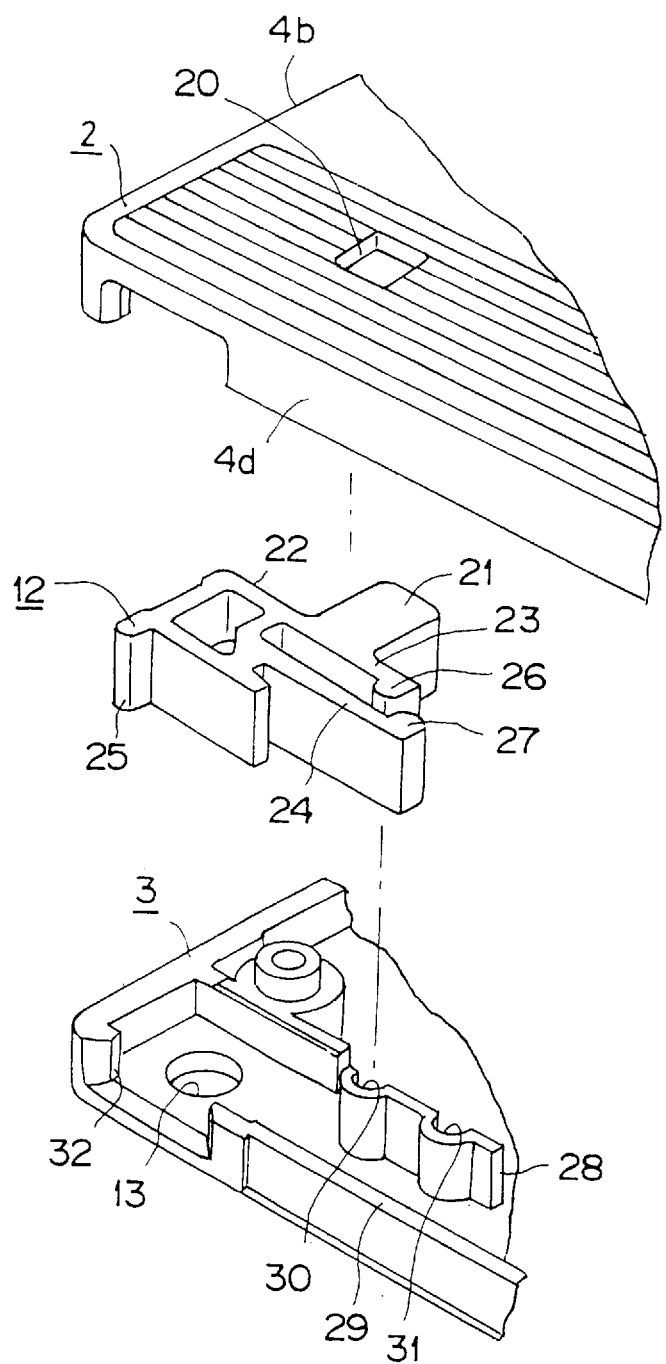
FIG. 4 is a perspective view showing a mistaken recording inhibiting member of a disc cartridge according to the present invention.

More specifically, the mistaken recording inhibiting member 12 employed for the disc cartridge according to the present invention has, at its proximal end, a substantially rectangular mistaken recording inhibiting portion 22 sized to sufficiently close the detection hole 13 formed in the lower cartridge half 3, as shown in FIG. 4. A pair of resiliently flexible arms, that is first and second flexible arms 23, 24, are formed from one side of the mistaken recording inhibiting portion 22 in a facing relation to each other. The first and second flexible arms 23, 24 are of different lengths, with the second flexible arm 24 being longer in length than the first flexible arm 23. The opposite sides of the distal ends of the first and second flexible arms 23, 24 are formed with retention ribs 26, 27 protruded from the flexible arms 23, 24, respectively. By forming the retention ribs 26, 27 on the opposite sides of the distal ends of the first and second flexible arms 23, 24 having different lengths, these retention ribs 26, 27 face each other in a meshing manner, as shown in FIG. 4.

Figure 5:
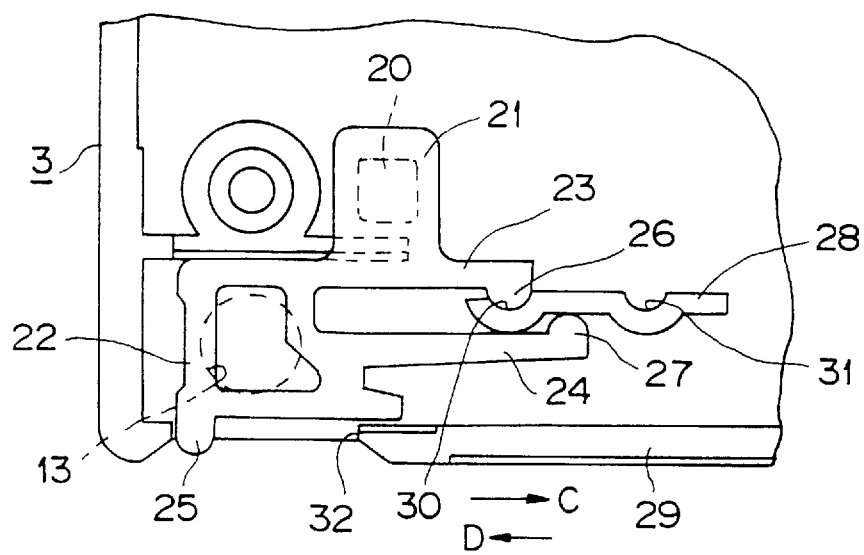
FIG. 5 is a plan view showing a mistaken recording inhibiting member mounted in a main cartridge body, with the mistaken recording inhibiting member being in a first position of closing a detection hole and a display hole provided in the cartridge main body.

When the mistaken recording inhibiting member 12 is arranged within the cartridge main body 4 with the first and second flexible arms 23, 24 extending along the movement direction of the mistaken recording inhibiting member 12, the indicating piece 21 is protruded from one end of the first arm 23 disposed within the inside of the cartridge main body 4, as shown in FIG. 5. In other words, the indicating piece 21 protrudes towards the inside of the cartridge main body 4 from one side of the first arm 23 when the indicating piece is exposed to the outside via the indicating window in the upper cartridge half 2 when the detecting hole 13 in the cartridge main body 4 is closed by the mistaken recording inhibiting portion 22. The indicating piece 21 is sized to sufficiently close the indicating hole 20.

On the lateral side of the mistaken recording inhibiting portion 22 opposite to its side having the indicating piece 21 exposed to outside of the cartridge main member 4, there is formed an actuation portion 25 for allowing manual movement of the mistaken recording inhibiting member 12.

On the inner surface of the lower half 3 of the cartridge main body 4 carrying the above-described mistaken recording inhibiting member 12, a slide guide piece 28 for guiding the movement of the first and second flexible arms 23, 24 is sandwiched between these first and second flexible arms 23, 24 and substantially upright, as shown in FIG. 5. This slide guide piece 28 is formed parallel to an upstanding peripheral wall 29 formed upright from the lower cartridge half 3 constituting the wall surface of the rear surface 4b of the cartridge main body 4.

The slide guide piece 28 is formed with first and second engagement recesses 30, 31 adapted for being engaged by the retention ribs 26 protuberantly formed on the distal ends of the first flexible arm 23. These first and second engagement recesses 30, 31 are formed by bending portions of the slide guide piece 28 from one to the opposite side of the slide guide piece 28, so that, when the mistaken recording inhibiting member 12 is moved to a position of closing the detection hole 13 and the indicating hole 20 and to a position of opening the detection hole 12 and the indicating hole 20, the engagement recesses 30, 31 are engaged by the retention ribs 26, respectively.

The lateral side 4d of the cartridge main body 4 extending at right angles to the lateral side 4a facing the connecting web 8c of the shutter member 8 has a cut-out 32 via which the actuating portion 25 formed in the mistaken recording inhibiting member 12 is exposed to the outside of the cartridge main body 4 to permit facilitated actuation from the outside, as shown in FIGS. 3 and 5. The cut-out 32 is formed by partially removing the upstanding peripheral wall 29 formed on the major surfaces of the upper and lower halves 2, 3 constituting the wall surfaces of the rear surface 4d of the cartridge main body 4. The cut-out 32 is of a width to permit the mistaken recording inhibiting member 12 to be moved between the position of closing the detection hole 13 and the indicating hole 20 and the position of opening the detection hole 13 and the indicating hole 20.

The mistaken recording inhibiting member 12 is mounted on the inner surface of the lower cartridge half 3 with the mistaken recording inhibiting portion 22 and the indicating piece 21 facing the detection hole 13 and the indicating hole 20, respectively, with the slide guide piece 28 being sandwiched between the first and second flexible arms 23, 24 and with the actuating portion 25 facing the cut-out 32, as shown in FIG. 5.

With the mistaken recording inhibiting member 12 being mounted in this manner on the lower cartridge half 3, the slide guide piece 28 is clamped by the first and second flexible arms 23, 24. Thus the mistaken recording inhibiting member 12 is positively held by the lower cartridge half 3 against inadvertent movement.

The mistaken recording inhibiting member 12 thus mounted on the lower cartridge half 3 and arranged in the cartridge main body 4, is moved in the directions indicated by arrows C and D in FIG. 5, by moving the actuating piece 25 facing to the outside of the back surface 4b of the cartridge main body 4 via the cut-out 32 with a finger's end, with the first and second flexible arms 23, 24 being then guided by the slide guide piece 28.

When the mistaken recording inhibiting portion 22 closes the detection hole 13 and the indicating piece 21 faces the indicating hole 20, the retention rib 26 formed at the distal end of the first flexible arm 23 is engaged with the first engagement recess 30 formed in the slide guide piece 28 for stopping the movement of the mistaken recording inhibiting member 12, as shown in FIG. 5. If, with the detection hole 13 in the cartridge main body 4 closed by the mistaken recording inhibiting member 12, the disc cartridge is loaded on the recording and/or reproducing apparatus, a mistaken recording detection portion provided on the recording and/or reproducing apparatus is prohibited from being intruded into the detection hole 13. The result is that the recording and/or reproducing apparatus judges that information signals can be recorded on the magneto-optical disc 1 housed within the cartridge main body 4. Thus, when the recording mode is set, the recording and/or reproducing apparatus starts recording information signals on the magneto-optical disc 1.

When the detection hole 13 is closed by the mistaken recording inhibiting member 12 so that information signals can be recorded on the magneto-optical disc, the indicating piece 21 is exposed to outside from the upper major surface of the cartridge main body 4 via the indicating hole 20. The color tint of the indicating piece 21 facing the indicating hole 20 indicates that the magneto-optical disc 1 housed within the cartridge main body 4 is exclusively used for recording information data. That is, the disc cartridge user checks the color tint of the indicating piece 21 facing the indicating hole 20 in order to judge whether or not the disc housed within the disc cartridge is exclusively used for recording information data.

In particular, the indicating piece 21 indicating the sort of the disc housed within the cartridge main body 4 faces outward via the indicting hole 20 formed in the upper major surface of the cartridge main body 4, as shown in FIG. 2. Thus the sort of the disc may be easily discriminated during handling as when loading the disc cartridge on the recording and/or reproducing apparatus. In particular, since the indicating hole 20 is formed in the lateral side 4d opposite to the lateral side 4c via which the disc cartridge is inserted into the cartridge loading portion, as shown in FIG. 2, the indicating piece 21 facing the indicating hole 20 may be easily checked by the user during the time the disc cartridge is being loaded on the recording and/or reproducing apparatus. In addition, since the indicating piece 21 is colored differently from the cartridge main body 4, it is possible for the user to discriminate the disc sort information indicated on the indicating piece 21.

The indicating piece 21 formed integrally with the mistaken recording inhibiting member 12 opens and closes the indicating hole 20 with movement of the mistaken recording inhibiting member 12. When the mistaken recording inhibiting member 12 is moved to a position closing the detection hole 13 for enabling information signals to be recorded on the magneto-optical disc 1, the indicating piece 21 closes the indicating hole 20, at the same time as it faces outward via the indicating hole 20. Thus the indicating piece 21 facing outward via the indicating hole 20 indicates that information signals may be recorded on the magneto-optical disc 1.

Thus, with the present disc cartridge, when the information signals are enabled to be recorded on the magneto-optical disc 1 housed within the cartridge main body 4, the indicating piece 21 facing outward via the indicating hole 20 indicates whether the disc housed within the cartridge main body 4 enables recording exclusively of the information data or recording exclusively of other music sound signals.

Figure 6:
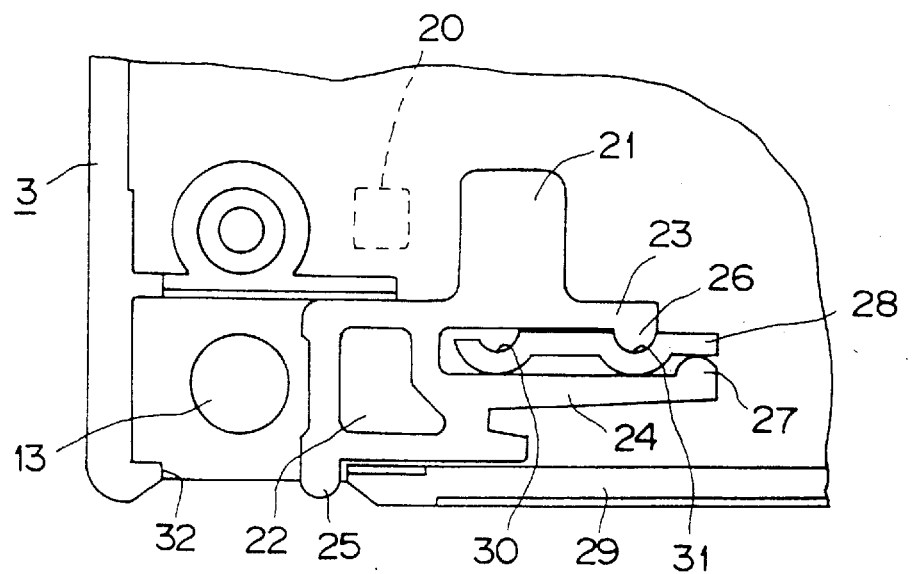
FIG. 6 is a plan view showing the mistaken recording inhibiting member in a second position of opening the detection hole and the display hole provided in the cartridge main body.
Figure 7:
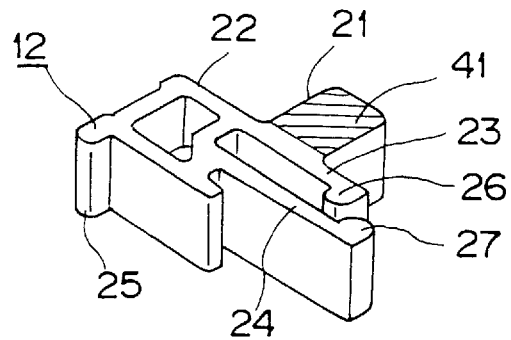
FIG. 7 is a perspective view showing a modification of the mistaken recording inhibiting member.

When the mistaken recording inhibiting member 12 is manually moved in the direction indicated by arrow C in FIG. 5, until the retention rib 26 formed at the distal end of the first elastically flexible arm 23 reaches a position of being engaged in the second engagement recess 31 formed in the slide guide piece 28, as shown in FIG. 6, the detection hole 13 is opened. When the mistaken recording inhibiting member 12 is moved to a position of opening the detection hole 13, as shown in FIG. 6, the mistaken recording detecting portion provided in the recording and/or reproducing apparatus detects the detection opening 13 on loading the disc cartridge in the recording and/or reproducing apparatus. The result is that the recording and/or reproducing apparatus judges that information signals cannot be recorded on the magneto-optical disc housed within the cartridge main body 4. When the mistaken recording inhibiting member 12 is moved to the position of opening the indicating hole 20, the indicating piece 12 is simultaneously moved to the position of opening the indicating hole 20. The indicating hole 20 being opened indicates that information signals cannot be recorded on the magneto-optical disc housed within the cartridge main body 4.

With the present disc cartridge, since the mistaken recording inhibiting member 12 in its entirety, inclusive of the indicating piece 21, is formed of a synthetic resin material having a pre-set color different from that of the cartridge main body 4, it is possible with the actuating portion 25 exposed outwardly of the cartridge main body 4 via the cut-out 32 formed in the cartridge main body 4 to indicate whether the disc housed within the cartridge main body 4 enables recording exclusively of information data or enables recording of other information signals, such as music signals.

Although the mistaken recording inhibiting member 12 in its entirety, inclusive of the indicating piece 21, is formed of a synthetic resin material of a pre-set color different from the color of the cartridge main body 4, it is also possible to apply an ink of a pre-set constant color different from that of the cartridge main body 4 by printing on the surface of the indicating piece 21 exposed in the indicating hole 20 in order to indicate the sort of the disc housed within the cartridge main body 4 by a colored inked portion 41 formed on the indicating piece 21.

The colored inked portion 41 formed on the surface of the indicating piece 21 exposed to the indicating hole 20 may also be formed by bonding a film or paper sheet having pre-set coloring.

Figure 8:
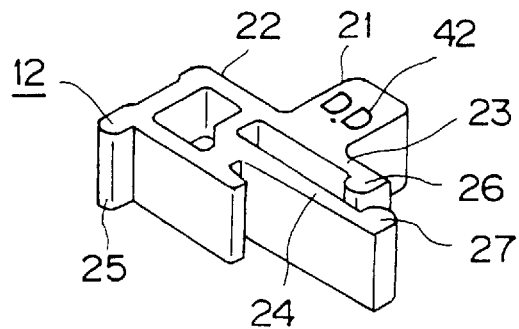
FIG. 8 is a perspective view showing another modification of the mistaken recording inhibiting member.
Figure 9:
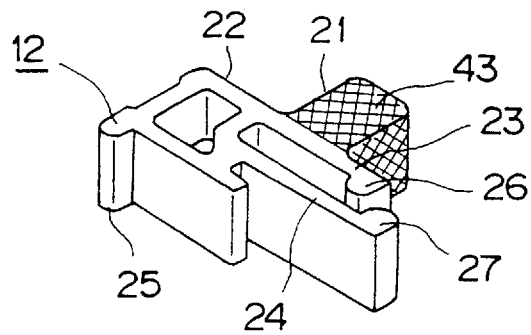
FIG. 9 is a perspective view showing still another modification of the mistaken recording inhibiting member.

It is also possible for the surface of the indicating piece 21 exposed to the indicating hole 20 to have a symbol 42 indicating the sort of the disc housed within the cartridge main body 4, such as by embossing, as shown in FIG. 8. The embossed symbol 42 may be applied during molding of the mistaken recording inhibiting member 12 or during a subsequent process following the molding of the mistaken recording inhibiting member 12.

In addition, it is possible to mold the mistaken recording inhibiting member 12 by two-color molding using two sorts of synthetic resins having different colors so that the indicating piece 21 has a color different from the color of the remaining portions of the mistaken recording inhibiting member 12, such as the mistaken recording inhibiting portion 22, with the color of the indicating piece 21 functioning as an indicating portion 43 for indicating the sort of the disc housed within the cartridge main body 4.

The present invention is not limited to the above-described embodiments since various modifications may be made without departing from the scope of the invention.

What is claimed is:

1. A disc cartridge comprising:
    a cartridge main body rotatably housing a disc on which information signals are pre-recorded or are to be recorded, said cartridge main body having a recording/reproducing aperture via which at least a portion of said disc is exposed to the outside along the radius of said disc;
    a shutter member movably mounted on said cartridge main body for opening/closing said recording/reproducing aperture; and
    a mistaken recording inhibiting member, said mistaken recording inhibiting member having a mistaken recording inhibiting portion of a size sufficient to close a mistaken recording detection hole formed in said cartridge main body, an actuating portion for movement between a first position of closing said mistaken recording detection hole by said mistaken recording inhibiting portion and a second position of opening said mistaken recording detection hole, and an indicating portion positioned facing an indicating hole formed in said cartridge main body for visually indicating through the indicating hole the sort of the disc housed within said cartridge main body being either of a magneto-optical disc having a predetermined format for recording and/or reproducing audio signals or a magneto-optical disc having a predetermined format for recording and/or reproducing data signals, when the mistaken recording inhibiting member is at a predetermined one of the first position or the second position.

2. The disc cartridge as claimed in claim 1, wherein said mistaken recording detection hole is formed in one of two major flat surfaces of the cartridge main body having an opening via which rotating means for rotating said disc housed within said cartridge main body may be intruded, said indicating hole being formed in the other major flat surface of the cartridge main body.

3. The disc cartridge as claimed in claim 1, wherein a visual indication on said mistaken recording inhibiting member is at a position in register with said indicating hole when the mistaken recording inhibiting portion is at the first position of closing said mistaken recording detection hole.

4. The disc cartridge as claimed in claim 1, wherein said indicating portion is colored differently from said cartridge main body.

5. A disc cartridge comprising:
    a cartridge main body rotatably housing a disc-shaped recording medium and having a recording/reproducing aperture via which at least a portion of the disc-shaped recording medium housed therein is exposed to the outside along the radius of the disc-shaped recording medium one of two major flat surfaces of the cartridge main body having a detection hole for detecting whether or not information signals may be recorded on the disc-shaped recording medium housed therein;

a shutter member movably mounted on said cartridge main body for opening or closing said recording/reproducing aperture;

an actuating member having a first opening/closing portion of a size sufficient to close said detection hole of said cartridge main body and an actuating portion movable between a first position of closing said detection hole by said first opening/closing portion and a second position of opening said detection hole by said first opening/closing portion, said actuating member being arranged in said cartridge main body for movement between the first position and the second position; and indicating means provided on the other major flat surface of said cartridge main body for visually indicating the sort of the disc-shaped recording medium housed within said cartridge main body being either of a magneto-optical disc having a predetermined format for recording and/or reproducing audio signals or a magneto-optical disc having a predetermined format for recording and/or reproducing data signals, when the actuating member is at a predetermined one of the first position or the second position, wherein said indicating means comprises an indicating hole formed on the other major flat surface of the cartridge main body and a second opening/closing portion formed in said actuating member, said second opening/closing portion being of a size sufficient to close said indicating hole.

6. The disc cartridge as claimed in claim 5, wherein said indicating hole is opened at the same time as said detection hole is opened on movement of said actuating member from said first position to said second position, and wherein, when said actuating member is moved from said second position to said first position, said detection hole is closed by said first opening/closing portion, at the same time as said indicating hole is closed by said second opening/closing portion.

7. The disc cartridge as claimed in claim 5, wherein said detection hole formed in the one major flat surface of said cartridge main body and said indicating hole formed in the other major flat surface of said cartridge main body are formed at offset portions from each other in a planar direction of the cartridge main body.

8. The disc cartridge as claimed in claim 5, wherein said actuating member has a holding portion formed along the direction of movement of said actuating member for holding said actuating member at said first position or said second position, said first opening/closing portion opening or closing said detection hole is formed at one side of said holding portion, said second opening/closing portion being integrally formed with said actuating member in a direction at right angles to the direction of movement of said actuating member.

9. The disc cartridge as claimed in claim 8, wherein said holding portion is made up of a pair of arms formed along the direction of movement of said actuating member, the inner surface of said cartridge main body having a raised portion sandwiched between said arms, said arms or said raised portion having an engagement protrusion and said raised portion or said arms having plural engagement recesses in register with said first position or said second position, said engagement protrusion being engaged with one or the other of said engagement recesses for holding said actuating member in said first position or said second position.

10. The disc cartridge as claimed in claim 5, wherein said indicating hole is formed in a rear upper surface of the cartridge main body along the direction of insertion of the disc cartridge into a recording and/or reproducing apparatus.

11. The disc cartridge as claimed in claim 5, wherein an opening is formed in a lateral side of the cartridge main body so that at least a part of said actuating portion of said actuating member may be protruded therein.

\* \* \* \* \*